J. E. MILES.
OFFSET DEVICE.
APPLICATION FILED APR. 6, 1911.
1,016,082.
Patented Jan. 30, 1912.
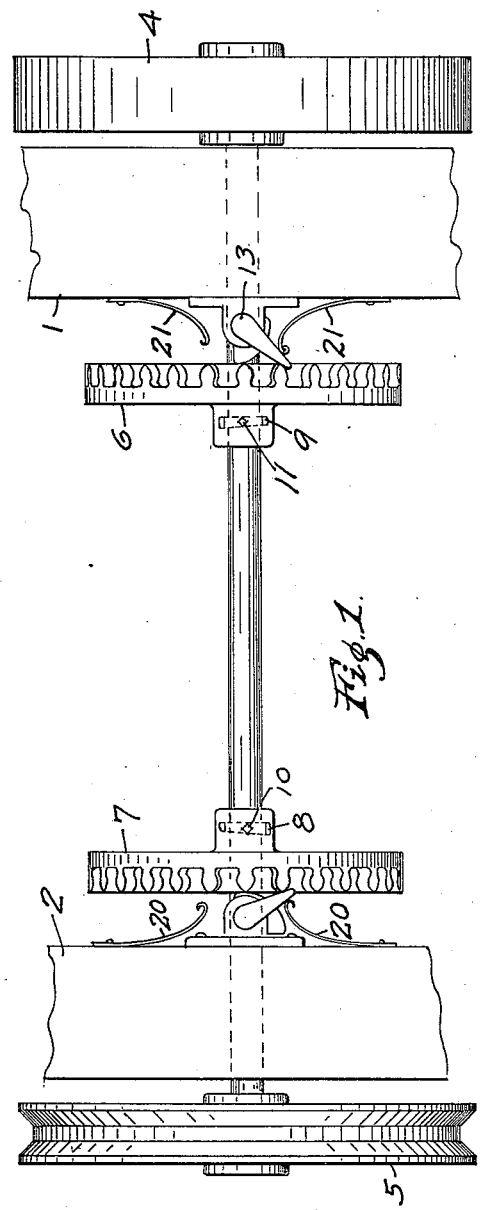
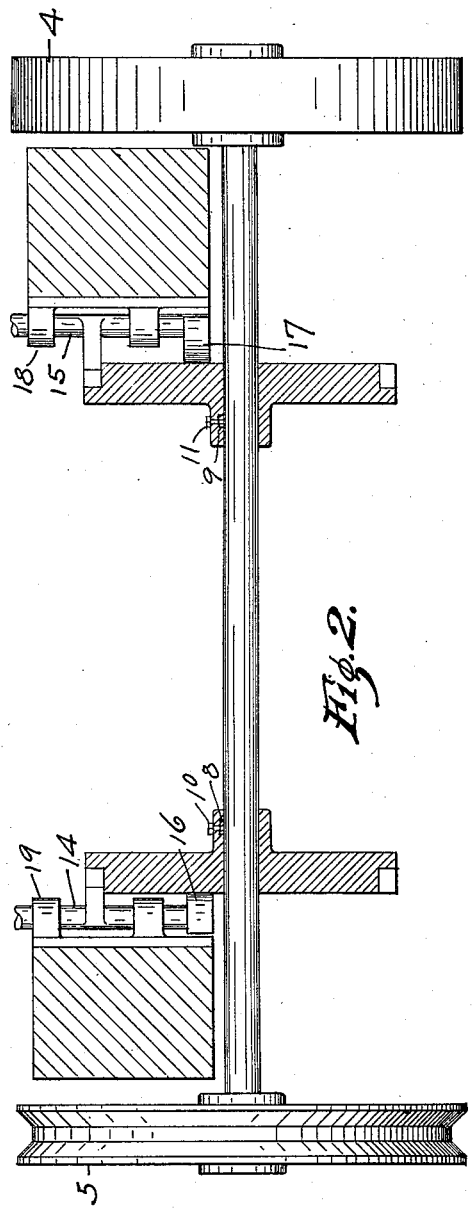

UNITED STATES PATENT OFFICE.

JAMES E. MILES, OF SPOKANE, WASHINGTON.

OFFSET DEVICE.

1,016,082. Specification of Letters Patent. Patented Jan. 30, 1912.

Application filed April 6, 1911. Serial No. 619,373.

*To all whom it may concern:*

Be it known that I, JAMES E. MILES, a citizen of the United States, residing at Spokane, in the county of Spokane and State of Washington, have invented certain new and useful Improvements in Offset Devices; and I do hereby declare the following to be a full, clear, and exact description of the invention, such as will enable others skilled in the art to which it appertains to make and use the same.

This invention relates to off-set devices to be used in connection with saw mill carriages to keep the log or other timber from the saw on the return movement of the carriage; and has for an object the arrangement of improved means for automatically moving the log carriage toward and from the saw.

A further object of the invention is the arrangement of a plurality of gears, pawls acting thereon, and cams connected with the pawls for shifting the carriage back and forth automatically as the same moves to its extreme positions.

With these and other objects in view the invention comprises certain novel constructions, combinations, and arrangement of parts as will be hereinafter more fully described and claimed.

In the accompanying drawings: Figure 1 is a fragmentary top plan view of a saw mill carriage frame. Fig. 2 is an end view of the structure shown in Fig. 1.

Referring to the drawing by numerals, 1 and 2 indicate the supporting side rails of a saw mill carriage on which a platform or other log holding device is placed, and which may be constructed in any desired manner. The beams 1 and 2 are connected with a supporting axle 3 which is supported by traction wheel 4 and a grooved wheel 5. Of course it will be evident that any desired number of axles 3 and wheels 4 and 5 may be used for properly supporting the carriage, but for the purpose of illustration only one has been shown. The wheels 4 and 5 are rigidly secured to axle 3 so as to turn therewith, and turn gear wheels 6 and 7 which are held rigidly to axle 3 by cross keys 8 and 9. The cross keys 8 and 9 may be held in place by set screws 10 and 11 if desired, or the set screws 10 and 11 may be used simply to bind against axle 3 and assist the keys in holding the gear wheels 6 and 7 rigidly to axle 3. Pawls 12 and 13 are arranged to engage the gear wheels 7 and 6 respectively so that when the carriage is reversed in the usual manner the gear wheels will turn the pawls, and also their retaining shafts 14 and 15 for moving cams 16 and 17. The shafts 14 and 15 are held properly in place by suitable brackets 18 and 19 secured to the beams 1 and 2 respectively. The pawls 12 and 13 are held properly in engagement with the teeth of the gear wheels 6 and 7 by suitable springs 20—20 and 21—21 for causing a proper operation at all times. The cams 16 and 17 are set in opposition so that when the carriage is shifted or moved for causing the saw to cut the carriage will be held over toward the saw by one of the cams, and when the carriage begins its return stroke the cams will be shifted for moving the beams 1 and 2 away from the saw, and consequently moving the log and other associated parts. As will be observed from Fig. 1 the pawls 12 and 13 slip over the teeth of the gear wheels 6 and 7 immediately after they have been turned to either position, but are constantly in contact with the gear wheels so as to instantly shift the carriage when the same changes its motion.

What I claim is:

1. In an off-set device, the combination with a carriage having supporting beams, of a pair of gear wheels arranged on the axle of the carriage, a pawl pivotally mounted on each of said beams for engaging and being operated by said gear wheels, and a cam rigidly connected with each of said pawls engaging said beams for moving the beams longitudinally of said axle, one of said cams being designed to move the beams in one direction and the other cam being designed to move the beams in the opposite direction.

2. In an off-set device for saw mills, the combination with a carriage having a pair of beams, of a bracket secured to each of said beams, a shaft pivotally mounted in each of said brackets, a cam rigidly secured to each of said shafts, a pair of gear wheels connected rigidly with the axle of said carriage, said gear wheels being designed to continuously contact with said cams, and a pawl rigidly secured to each of said shafts and arranged to engage said respective gear wheels for being operated thereby whenever the same are reversed, whereby said cams will be operated for shifting the carriage in respect to said gear wheels and the axles connected therewith.

3. In an off-set device for saw mills, the combination with a carriage formed with a plurality of supporting axles and traction means connected therewith, of a pair of gear wheels rigidly secured to one of said axles and rotated thereby, a pivotally mounted pawl arranged to normally slidingly engage the edge of the teeth of said gear wheels, a pair of springs for each of said pawls for holding the same in engagement with said teeth, the sliding engagement of said pawl permitting said gear wheels to rotate as the carriage is moved in one direction without shifting the position of the pawls but causing the pawls to shift their positions when the direction of movement of the carriage is reversed, and a cam connected with each of said pawls for shifting the carriage laterally when the positions of the cams are shifted.

4. In an off-set device, parallel side rails, an axle journaled transversely relative to the side rails, wheels rigidly mounted upon the axle adjacent the side rails and provided with teeth extending parallel to the axis of the axle, shafts journaled upon the side rails adjacent the gear wheels and provided with pawls positioned to engage such gear teeth and cams carried by the shafts in engagement with the gear wheels, such cams being set in opposition.

5. In an off-setting device, parallel side rails, an axle journaled transversely relative to the side rails, wheels carried rigidly upon the axle adjacent the side rails, shafts journaled upon the side rails at right angles to the axle, pawls carried by the shafts extending into engagement with the wheels and proportioned to rotate with the shaft when operated upon by the teeth, and cams carried by the shafts bearing against the opposite faces of said wheels and capable of moving the side rails transversely when such cams are reversed.

In testimony whereof I affix my signature in presence of two witnesses.

JAMES E. MILES.

Witnesses:
H. E. SMITH,
NETTIE KING.

---

Copies of this patent may be obtained for five cents each, by addressing the "Commissioner of Patents, Washington, D. C."